Jan. 18, 1966     G. H. BALDING     3,230,530
RADAR DATA CONVERTER
Filed March 25, 1964     2 Sheets-Sheet 2

TERRAIN CLEARANCE DISPLAY

INVENTOR.
GEORGE H. BALDING
BY
ATTORNEY

United States Patent Office 3,230,530
Patented Jan. 18, 1966

3,230,530
RADAR DATA CONVERTER
George H. Balding, Fremont, Calif., assignor, by mesne assignments, to the United States of America as represented by the Secretary of the Navy
Filed Mar. 25, 1964, Ser. No. 354,808
6 Claims. (Cl. 343—17.1)

The present invention relates to a system providing a display of terrain clearance, and more particularly to a system for converting radar data received from a radar having no vertical scan capability into display of terrain clearance.

Various techniques are presently employed for apprising a pilot of real world conditions external to an aircraft. Important among these techniques is a display system which reproduces on a cathode ray tube screen a display of terrain clearance of the aircraft. In such a system a radar data converter receives information consisting of azimuth and range data from the aircraft radar equipment. This radar derived data is processed by the radar data converter and presented on the cathode ray tube screen as a series of azimuth terrain profiles wherein each profile displayed appears at a different range. A requirement of this system is that the radar equipment from which it receives terrain clearance data have an antenna system which scans both in the horizontal and vertical directions.

The present invention contemplates a system for simulation of a complete terrain clearance display wherein the data supplying radar has only horizontal scan capabilities. In this type of operation the radar antenna scans the terrain profile in azimuth. The radar return echoes are functions of the antenna depression angle which remains constant with relation to the horizon, azimuth position, and range to an object. The radar video signal information then contains range-to-target data for various antenna azimuth positions. In order to generate terrain profiles as functions of range it is necessary to simulate terrain information above and below the terrain information as received from the radar signal. This is true with the assumption that the terrain does in fact extend below and above the terrain which reflects the radar beam. Thus, the system of the present invention receives radar information of actual terrain profile at one range and by a unique arrangement simulates terrain profile information for various other ranges and thereby provides a display of terrain clearance.

The present invention is a modification of patent application Serial No. 126,436, filed July 13, 1961, of George H. Balding for Radar Display Converter. The present invention greatly enhances the utility of the radar display converter set forth in the above patent application by providing a terrain clearance display even where the radar antenna has no vertical scan capability. It is pointed out that although the present invention speaks in terms of simulation the simulation is actually built upon actual radar data of range at various headings thereby providing the pilot with actual terrain profile at one range and simulated terrain profiles at various other ranges above and below the actual range. Since the simulated terrain information is based on actual radar data for one range, the simulated display of terrain profiles at the various other ranges is a good approximation of these terrain profiles.

Therefore, it is an object of the present invention to provide a radar data converter for use with radar equipment having only a horizontal scan which generates simulated video signals at various ranges from a video signal at one range to provide a display of terrain clearance.

Another object of the present invention is to provide a radar data converter for use with radar equipment having horizontal scan capability only for providing a presentation of actual terrain profile at one range and simulated terrain profile at various other ranges on one display.

A further object of the present invention is to provide a radar display converter capable of utilizing range-to-target video information for various headings and at various ranges to generate a plurality of terrain information signals for various ranges to provide a terrain clearance display on a cathode ray tube.

Other objects and many of the attendant advantages of this invention will become apparent with the reading of the following specification in conjunction with the drawing.

Figure 1:
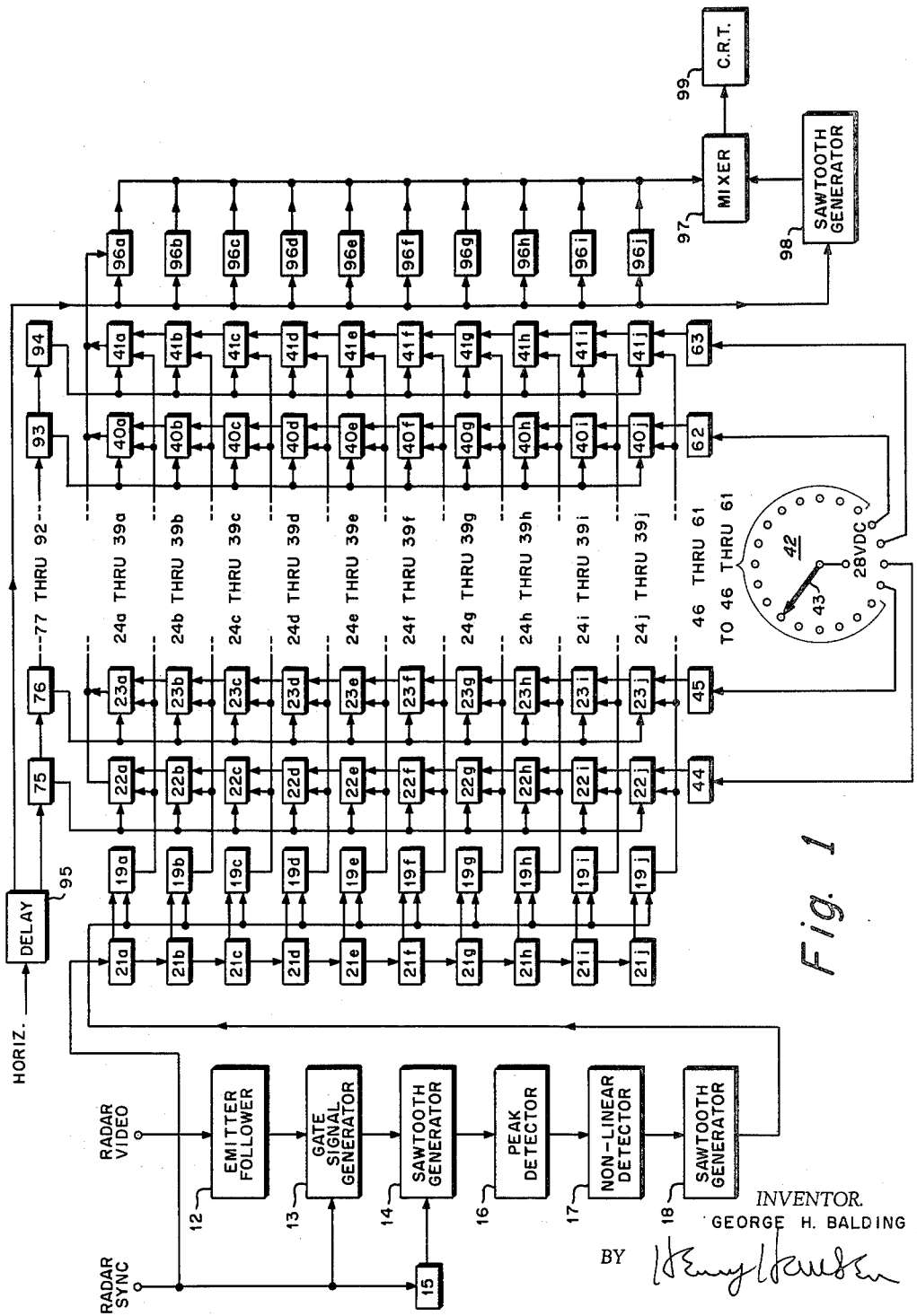
FIG. 1 illustrates in block diagram form a preferred embodiment of the present invention.

Referring now to FIG. 1 there is shown the radar data converter of the present invention. Radar data converter 11 has two functional modes—the data storage mode and the data display mode. Each mode may occur simultaneously but for purposes of clarity in structural presentation the two modes are discussed separately.

Figure 2:
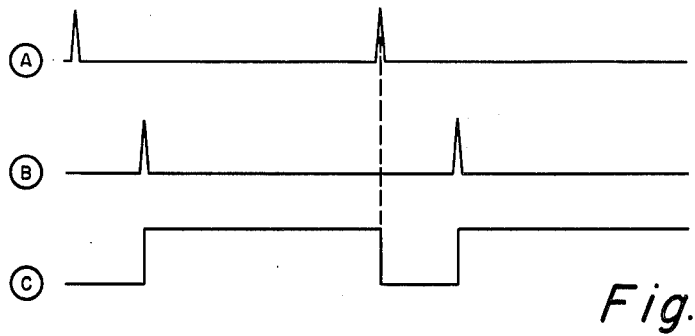
FIG. 2 is a representation of the timing relationship between some of the waveforms used in the present invention.

In the storage mode the radar data converter 11 utilizes the radar sync signal and radar reflected pulse, the latter pulse being connected for storing in a plurality of storage units signals for later display of a plurality of terrain profiles or range slices. The radar sync signal shown in line A of FIG. 2 has a pulse repetition frequency of 1200 pulses per second. The radar sync pulse and the transmitted radar pulse (not shown in FIG. 2) occur simultaneously such that the relative position of the radar video or reflected pulse with respect to the radar sync pulse is an indication of the slant range from the radar antenna to the target since the time between the transmission of the radar pulse and the return of radar video is a measure of the slant range. The radar video is shown in FIG. 2, line B.

The radar video and the radar sync signals are utilized by the radar data converter of the present invention to generate a signal which simulates signals bearing terrain profile information. The radar video is applied to a gate signal generator 13 through an emitter follower 12 where it is modified to provide a gate signal. Gate signal generator 13 comprises a bistable multivibrator wherein the radar sync pulse is applied as shown to trigger one side of the multivibrator while the radar video is used to trigger the other side thereby providing a waveform like that shown in line C of FIG. 2 which is a modified radar video signal or a gate signal with the leading edge of the gate occurring at a time determined by the radar video. Since it is the radar video or reflected radar pulse which determines range, an output gate signal having a large width signifies a target that is close to the aircraft while an output gate signal having a smaller width is generated by more distant echoes. The radar sync pulse and the modified radar video form the inputs to the simulated terrain signal generator.

The modified radar video provides an input to the range sawtooth generator 14 controlling the amplitude of the range sawtooth voltage thereby making the range sawtooth a function of the slant range to the target. The duration of the range sawtooth is restricted to 149 microseconds by a one-shot multivibrator 15. One-shot multivibrator 15 which is triggered by the radar sync pulse cuts off range sawtooth generator 14 after 149 microseconds. Range sawtooth generator 14 provides the range sawtooth as an input to peak detector 16 which generates a D.C. voltage having an amplitude which varies with the peak voltage of the range sawtooth. Thus, the output of peak detector 16 provides a D.C. voltage which varies in direct relationship with range to the target. Nonlinear detector 17 receives this D.C. voltage and provides a nonlinear amplificaiton of the D.C. voltage in the zero to 1000 feet range and a linear amplification for ranges over 1000 feet. The output from a nonlinear detector 17 is fed to sawtooth generator 18 wherein it is utilized to shape an 834 microsecond sawtooth waveform, thus varying the sawtooth shape directly as the D.C. voltage, either as to mean height or rate of rise. Since there is a greater change in the D.C. voltage in the range from zero to 1000 feet, a greater change in the shape of the sawtooth waveform from sawtooth generator 18 occurs in this range.

The output from sawtooth generator 18 is fed to ten identical rectifiers 19a through 19j. The radar sync pulse is fed to ten identical one-short multivibrators 21a through 21j which function as range gates. The one-shot multivibrators 19a through 19j are sequentially operated by each radar sync pulse. Range gates 21a through 21j are connected to rectifiers 19a through 19j, respectively, and provide gating pulses from each of the rectifiers 19a through 19j. A portion of the shaped sawtooth voltage from sawtooth generator 18 is passed by rectifiers 19a through 19j in response to the gate pulses from one-shot multivibrators 21a through 21j, respectively. Each of the outputs of the individual rectifiers 19a through 19j is a D.C. voltage having a magnitude that varies from −10 to 0 volts depending upon the voltage amplitude of the shaped sawtooth which is gated through the individual rectifier.

The range gated video from rectifiers 19a through 19j is fed to a plurality of storage units comprising ten rows of twenty columns totalling 200 units in all. Each of rectifiers 19a through 19j is connected in a manner to be more fully explained hereinbelow to one row of 20 storage units. Rectifier 19a, for example, is connected to storage units 22a through 41a. Since rectifiers 19b through 19j are connected to their respective rows of storage elements in a manner identical to that of rectifier 19a, only the connections of 19a will be discussed in detail. Further, only those storage elements necessary for the description of the present invention are actually shown in the drawing. Depending on the azimuth position of the antenna the output from rectifier 19a is connected to one of storage units 22a through 41a. Similarly, the outputs from each of rectifiers 19b through 19j are connected to one of the storage units in its respective row.

The radar video from the rectifiers 19a through 19j is applied to the storage units through relays within each of the storage units which are actuated by a commutator switch 42 which is mechanically connected to the aircraft antenna and which follows the azimuth scanning. Commutator switch 42 comprises a switch arm 43 and twenty switch contacts numbered 1 through 20 as shown. For each scan of the aircraft antenna switch arm 43 will make one full revolution making and breaking contact with switch contacts 1 through 20 in succession. Switch contacts 1 through 20 are connected to emitter followers 44 through 63, respectively. Switch arm 43 is connected to a 28 volt D.C. power source thereby connecting the power source to one of the emitter followers 44 through 63 depending on the position of switch arm 43. For example, when the switch arm 43 is making contact with contact 1 of commutator switch 42, the 28 volt D.C. power source is connected to emitter follower 44. On being energized emitter follower 44 supplies energizing power to serially connected relays in each of storage units 22a through 22j to connect the outputs from rectifiers 19a through 19j thereto, respectively. When switch arm 43 makes contact with contact 2 of commutator switch 42, emitter follower 45 is supplied with the 28 volt D.C. power source thereby causing the relays in storage units 23a through 23j (not all shown) to connect the outputs from rectifiers 19a through 19j thereto, respectively.

Figure 4:
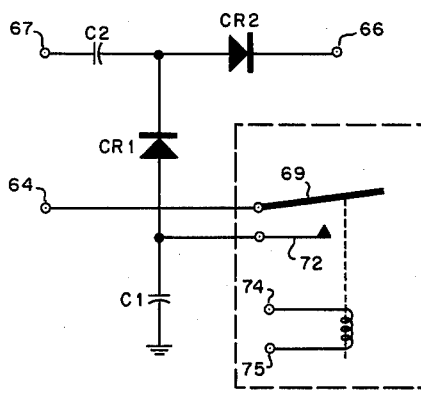
FIG. 4 is a schematic representation of one of the storage units shown in block form in FIG. 1.

FIG. 4 illustrates the schematic details of one of the 200 identical storage units. For purposes of explanation, a scale factor of 0 to −10 volts has been chosen. The storage unit comprises an input terminal 64 and an output terminal 66. A third terminal 67 connected to the interrogating pulse generating means, to be more fully described, is connected to output terminal 66 via coupling capacitor C2 and diode CR2. Storage capacitor C1 and diode CR1 are connected in series between ground and the point of common junction of capacitor C2 and diode CR2, as shown. When relay 71 is energized, switch arm 69 is connected to contact 72 thereby connecting input terminal 64 to the common point of junction of capacitor C1 and diode CR1. Terminal 73 is connected to one of the emitter followers 44 through 63. When switch arm 43 makes contact with the proper one of contacts 1 through 20 of commutator switch 42, relay 71 is energized. For example, in the case of storage unit 22j, relay 71 is energized when switch arm 43 makes contact with contact 1 of commutator switch 42. Each of the storage units of the present invention has a relay similar to relay 71 and in respective columns of storage units the coils of these relays are connected in series. In the particular example just chosen terminal 74 of relay 71 is connected to the energizing terminal of the relay in the next storage unit which in this case is 22i. Thus, when the relay in any one column of storage units is energized, all of the relays in each of the storage units in that column are energized.

As aforesaid, when relay 71 is energized, switch arm 69 makes contact with contact 72. Assuming that the radar video input from the associated rectifier is −5 volts, the storage capacitor C1 charges to −5 volts and the coupling capacitor C2 assumes a bias of −5 volts with respect to ground. This occurs due to the finite back resistance of CR1. With a positive 10 volt interrogating pulse applied to input terminal 67 capacitor C2 becomes negatively charged. Since capacitor C2 is negatively charged, diode CR2 is back biased until the magnitude of the pulse equals the initial voltage applied to capacitor C2. The amplitude of the output pulse is then equal to 10 volts minus the D.C. level of the radar video input. Therefore, when the input is −10 volts, the output at terminal 66 is zero. When the input is zero volts, the output at terminal 66 is +10 volts. Thus, the transfer function of the storage unit circuit is substantially linear. For each position of switch arm 43 of commutator switch 42 each storage unit in a column receives and stores range data.

In the display mode of operation of the present invention interrogating or readout pulses are generated in one-shot multivibrators 75 through 94. These one-shot multivibrators are triggered by the horizontal sync pulse of the system through sync delay 95. One-shot multivibrators 75 through 94 are arranged in cascade such that the first one triggers the second, which in turn triggers the third, etc. until all twenty have been fired. Each of the one-shot multivibrators 75 through 94 is connected to each of the storage units of one column. For example, one-shot multivibrator 75 supplies an interrogating pulse to each of storage units 22a through 22j. The result of the triggering action is to interrogate each of the columns of storage units in succession and each of the storage units within a column simultaneously. As each column of storage units is interrogated, the outputs therefrom are fed to clipper circuits 96a through 96j. For example, when one-shot multivibrator 75 provides an interrogating pulse to storage units 22a through 22j, the outputs from storage units 22a through 22j are applied to clipper circuits 96a through 96j, respectively. For each horizontal sync pulse the outputs from each of the columns are applied to respective clipper circuits in succession.

The clipping circuits 96a through 96j thus simultaneously receive ten range video signals from one of the columns of storage circuits, such as 22a through 22j. The amplitude of these signals represents the height of the terrain as derived from the sampled range in one small sector of the radar sweep; that is, range No. 1 video represents the lowest, or nearest, range on the display, and so on out to the tenth range line which represents the tenth range; however, since the ten range video signals are applied simultaneously, the clipping circuits must be able to detect the instantaneous position of the sweep on the display, and gate only the readout-gate (video) signal that corresponds to the position (or range) of the sweep. The clipper circuits accomplish this in the following manner.

Each clipping module receives three signals including a preset clipping-level signal from an associated potentiometer, a vertical sawtooth from the vertical sawtooth generator 98, and a range video signal from its associated storage circuit (i.e., mixer 96a receives a signal from storage circuit 21a wherever the first column is interrogated). Each range video signal occurs aprpoximately 625 times during the time of one vertical sawtooth.

At the beginning of the vertical sawtooth, clipper 96a is at cutoff and thus range No. 1 video is not coupled through the clipper; however, when the vertical sawtooth reaches a level sufficient to allow the clipper to conduct (for range No. 1 video just after the start of the negative vertical sawtooth at the bottom of the display), range No. 1 viedo is allowed to pass through the clipper to the cathode ray tube 99.

As long as the aircraft remains at a value equivalent to 0-degrees pitch (normal aircraft altitude), clipper 96a allows the range No. 1 video to be coupled to the output mixer at the same point (or level) of the vertical sawtooth and thus at the same position on the display; however, when the aircraft changes altitude clipper 96a passes the range No. 1 video a little earlier or a little later during the time of the vertical sawtooth, depending on the direction of pitch change; hence, the display reflects this by an up or down motion of the No. 1, or bottom, range line.

Each of the remaining nine clipper modules operates in a manner similar to clipper module 96a, except that the preset clipping-level signals applied to these clipping modules from their respective potentiometers is such that the clipping modules pass their associated range video signals at a different point along the vertical sawtooth, and thus at a different position on the display. At 0-degrees pitch and level terrain conditions, range No. 10 video is allowed to pass through clipping module 96j at the midpoint of the vertical sawtooth (center of the display), and each of the other range video signals is passed by its assigned clipping module at successive higher levels of the vertical sawtooth (i.e., in a raster trace from bottom to top using a negative-going sawtooth).

Manifestly, an obstacle that is 10 miles ahead of the aircraft results in the peak value for the range No. 10 video exceeding the clipping level of clipper 96j at a point later in the vertical sawtooth (sweeping from bottom to top) and hence the 10-mile-range line appears at a higher position on the display. A more detailed description of the manner of operation of the device is set forth in patent application Serial No. 126,436, supra.

Figure 3:
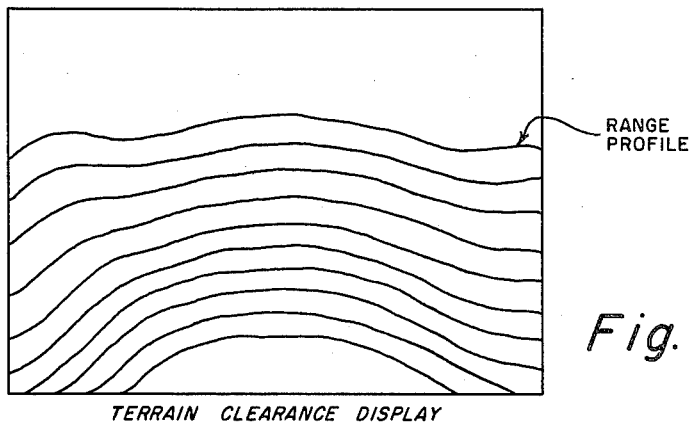
FIG. 3 illustrates an example of a typical display of terrain clearance provided by the present invention.

The output from mixer circuit 97 is fed to the video circuit of a cathode ray tube 99 which provides a terrain display similar to that shown in FIG. 3 wherein the irregular shaped, horizontal lines each represent a terrain profile at a different range. It should be borne in mind that although the presentation on the face of the cathode ray tube is a simulation, the simulation is based on actual radar video information and the terrain profiles which are almost identical to one another do represent an actual terrain profile at a constant range.

Obviously, many modifications and variations of the present invention are possible in the light of the above teachings. It is therefore to be understood that within the scope of the appended claims the invention may be practiced otherwise than as specifically decribed.

What is claimed is:

1. A radar video processing circiut for use with a radar system of an aircraft having horizontal but no vertical antenna scan capability for use with a terrain clearance generator circuit, comprising in combination:

gate generator means providing a pulse output having a duration determined by the time between reception of a radar video and transmission of a radar pulse of the aircraft radar, a first sawtooth generator connected to said gate generator means providing a range sawtooth voltage output having an amplitude which is a function of range to the target, peak detector means connected to said first sawtooth generator providing a D.C. voltage output having an amplitude which varies directly with the peak voltage of said range sawtooth, a second sawtooth generator connected to said peak detector means providing a sawtooth voltage to said terrain clearance generator circuit having a shape which varies directly as said D.C. voltage.

2. A radar video processing circuit as defined in claim 1 wherein the gate generator means comprises a bistable multivibrator adapted to be operated alternatively by the received video pulse and the transmitted radar pulse.

3. A radar video processing circuit as defined in claim 1 comprising a nonlinear detector connected to the peak detector providing increased amplification of the D.C. voltage in the closest range.

4. A radar video processing circuit as defined in claim 1 comprising a one-shot multivibrator restricting the duration of the range sawtooth voltage from the first sawtooth generator.

5. A radar video processing circuit as defined in claim 1 wherein both the gate generator means and the first sawtooth generator are controlled by the transmitted radar pulse.

6. A radar video processing circuit as defined in claim 1 comprising an emitter follower adapted to modify the received radar video pulse to provide a gate signal to trigger the gate signal generator.

References Cited by the Examiner
UNITED STATES PATENTS

| | | | |
|---|---|---|---|
| 2,412,111 | 12/1946 | Wilson. | |
| 2,421,018 | 5/1947 | De Rosa | 343—13 |
| 2,485,584 | 10/1949 | Ginzton | 343—13 |
| 2,504,975 | 4/1950 | Grieg | 343—13 |
| 2,537,569 | 1/1951 | Ballard | 343—13 X |
| 2,591,856 | 4/1952 | Oliver | 343—13 |
| 2,817,833 | 12/1957 | Hutchinson | 343—13 |

CHESTER L. JUSTUS, *Primary Examiner.*

R. D. BENNETT, *Assistant Examiner.*